(12) United States Patent
Ben-Tovim

(10) Patent No.: US 9,150,791 B2
(45) Date of Patent: Oct. 6, 2015

(54) TORREFACTION APPARATUS

(76) Inventor: Gershon Ben-Tovim, Cape Town (ZA)

( * ) Notice: Subject to any disclaimer, the term of this patent is extended or adjusted under 35 U.S.C. 154(b) by 762 days.

(21) Appl. No.: 13/381,694

(22) PCT Filed: Jul. 2, 2010

(86) PCT No.: PCT/IB2010/053046
§ 371 (c)(1),
(2), (4) Date: Mar. 5, 2012

(87) PCT Pub. No.: WO2011/001410
PCT Pub. Date: Jan. 6, 2011

(65) Prior Publication Data
US 2012/0261246 A1    Oct. 18, 2012

(30) Foreign Application Priority Data

Jul. 2, 2009   (ZA) .................................. 2009/04636
Oct. 5, 2009  (ZA) .................................. 2009/06900

(51) Int. Cl.
| C10B 1/06 | (2006.01) |
|---|---|
| C10B 47/30 | (2006.01) |
| C10B 53/02 | (2006.01) |
| C10G 9/02 | (2006.01) |
| C10B 1/08 | (2006.01) |
| C10G 9/04 | (2006.01) |

(Continued)

(52) U.S. Cl.
CPC . *C10B 53/02* (2013.01); *C10B 1/06* (2013.01); *C10B 1/08* (2013.01); *C10B 1/10* (2013.01); *C10B 47/30* (2013.01); *C10G 9/02* (2013.01); *C10G 9/04* (2013.01); *C10L 9/083* (2013.01); *F26B 11/0445* (2013.01); *F26B 23/022* (2013.01); *F26B 2200/02* (2013.01); *Y02E 50/14* (2013.01); *Y02E 50/15* (2013.01); *Y02E 50/30* (2013.01)

(58) Field of Classification Search
CPC .............. C10B 1/06; C10B 1/08; C10B 1/10; C10B 47/30; C10B 47/34; C10B 47/44; C10B 53/02; C10L 9/083; C10G 9/02; C10G 9/04
USPC .......... 201/15, 25, 27, 37; 202/117, 118, 136, 202/137, 138, 145, 146
See application file for complete search history.

(56) References Cited

U.S. PATENT DOCUMENTS

| 1,547,331 A * | 7/1925 | Kacser .......................... 202/136 |
| 3,787,292 A * | 1/1974 | Keappler ...................... 202/118 |

(Continued)

FOREIGN PATENT DOCUMENTS

| GB | 381881 | 10/1932 |
| WO | WO 2005/056723 | 6/2005 |

OTHER PUBLICATIONS

International Search Report for PCT/IB2010/053046, dated Nov. 1, 2010.

*Primary Examiner* — In Suk Bullock
*Assistant Examiner* — Jonathan Miller
(74) *Attorney, Agent, or Firm* — Stephen J. Weyer; Stites & Harbison PLLC

(57) ABSTRACT

The invention provides for torrefaction apparatus which includes a drum (14) having a biomass inlet (18) and a torrefied material outlet (20), furnace means (16) external of the drum (14) for heating the drum (14) so that torrefaction temperature is achieved in the drum, and a gas inlet conduit (42) leading to the drum (14) from a source of inert gas, thereby to create an torrefaction atmosphere in the drum (14).

7 Claims, 3 Drawing Sheets

(51) Int. Cl.
*C10B 1/10* (2006.01)
*C10L 9/08* (2006.01)
*F26B 11/04* (2006.01)
*F26B 23/02* (2006.01)

(56) References Cited

U.S. PATENT DOCUMENTS

| | | | |
|---|---|---|---|
| 4,563,246 A * | 1/1986 | Reed et al. | 202/100 |
| 5,101,740 A * | 4/1992 | Abril | 110/230 |
| 5,523,060 A * | 6/1996 | Hogan | 422/184.1 |
| 5,944,960 A * | 8/1999 | Nakata et al. | 202/100 |
| 6,213,030 B1 * | 4/2001 | Robertson et al. | 110/246 |
| 6,341,567 B1 * | 1/2002 | Robertson et al. | 110/203 |
| 8,304,590 B2 * | 11/2012 | Hopkins et al. | 585/240 |
| 8,669,404 B2 * | 3/2014 | Shulenberger et al. | 585/240 |
| 2003/0221363 A1 | 12/2003 | Reed | |
| 2006/0143977 A1 * | 7/2006 | Meijer et al. | 44/629 |
| 2006/0163053 A1 * | 7/2006 | Ershag | 201/13 |
| 2009/0007484 A1 * | 1/2009 | Smith | 44/606 |
| 2009/0084029 A1 | 4/2009 | Bergman | |
| 2009/0250331 A1 | 10/2009 | Hopkins et al. | |
| 2010/0083530 A1 | 4/2010 | Weisselberg et al. | |
| 2012/0217150 A1 * | 8/2012 | Kostek et al. | 202/108 |

* cited by examiner

TORREFACTION APPARATUS

FIELD OF THE INVENTION

This invention relates to torrefaction.

BACKGROUND TO THE INVENTION

Global warming, the emerging energy crisis, and the depletion of fossil fuel resources such as oil have created a need for more environmentally friendly solutions to provide energy. Several ideas and technologies are known to produce energy, and to confront the challenges associated therewith, although many of these technologies are not yet available on a commercial scale.

One solution to the energy crisis is to use biomass or bio fuel to address our energy shortages. Biomass or bio fuel is material derived from recently living organisms, which includes plants, animals and their by-products. It is a renewable energy source, unlike other natural resources such as petroleum, coal, and nuclear fuels.

The use of biomass fuels can contribute to waste management. One method of making biomass more efficient as an energy source is torrefaction.

Torrefaction is a thermo-chemical treatment method of biomass at temperatures between 200 to 500° C. at low oxygen conditions (Pyrolisis). The result of this process on the untreated biomass is to produce a product that is dry, hydrophobic and easily millable with an increased energy density that burns cleanly.

The torrefied biomass is hydrophobic, has lower moisture content, produces less smoke when burnt, has higher calorific values compared to untreated biomass, and is suitable for various applications as a fuel.

Known methods of producing torrefied biomass have an overall processing inefficiency and are expensive to implement, and harm the environment by emitting smoke. Furthermore, in some known torrefaction methods such as that disclosed in United States patent application 2003/0221363, the oxygen level has to be controlled, to prevent the torrefaction product being subjected to burning.

This invention seeks to provide an apparatus and a process for creating torrefied biomass that has a high output of torrefied biomass, a relatively low initial investment cost, and minimizes damage caused to the environment during the process.

SUMMARY OF THE INVENTION

According to a first aspect of the present invention there is provided a torrefaction apparatus, which includes:
  a drum having a biomass inlet and a torrefied material outlet,
  furnace means external of the drum for heating the drum so that torrefaction temperature is achieved in the drum, and
  a gas inlet conduit leading to the drum from a source of inert gas, thereby to create an atmosphere in the drum which promotes torrefaction.

The drum may be elongate and may be rotatable about its longitudinal axis.

The longitudinal axis of the drum may be inclined.

One or more pipes may be mounted within the drum and extend along the drum, each pipe may have an inlet and an outlet end through which hot gases may be fed through the pipes.

Said inlet ends of said pipes may be connected to the furnace so that furnace gases may flow through the pipes.

The apparatus may include biomass lifting elements protruding inwardly from the cylindrical wall of the drum.

The drum may be horizontally elongate and non-rotatable, and there may be a rotatable auger in the drum for moving biomass from said inlet to said outlet.

The auger may include lifting elements which span between adjacent turns of the auger.

Each lifting element and the parts of the auger adjacent to the lifting element may form a pocket.

The apparatus may include a combustible gas outlet from the drum and a pipe leading from said outlet to said furnace means for feeding to said furnace means combustible gases produced by torrefaction of the biomass.

The pipe may include a steam trap for removing water from gases flowing in said pipe.

The gas inlet conduit may feed furnace gases to said drum.

According to a second aspect of the present invention there is provided a process for producing torrefied biomass products, which includes the steps of:
  feeding biomass into a drum'
  creating an atmosphere in the drum which promotes torrefaction, and
  providing a source of heat externally of the drum to heat the drum to raise the temperature of the biomass in the drum to torrefaction temperature.

The atmosphere may be entirely inert, or may contain traces of oxygen.

The process may include rotating an auger within the drum, to move biomass along the drum.

BRIEF DESCRIPTION OF THE DRAWINGS

For a better understanding of the present invention, and to show how the same may be carried into effect, the invention will now be described by way of non-limiting example, with reference to the accompanying drawings in which.

DETAILED DESCRIPTION OF THE DRAWINGS

Figure 1:
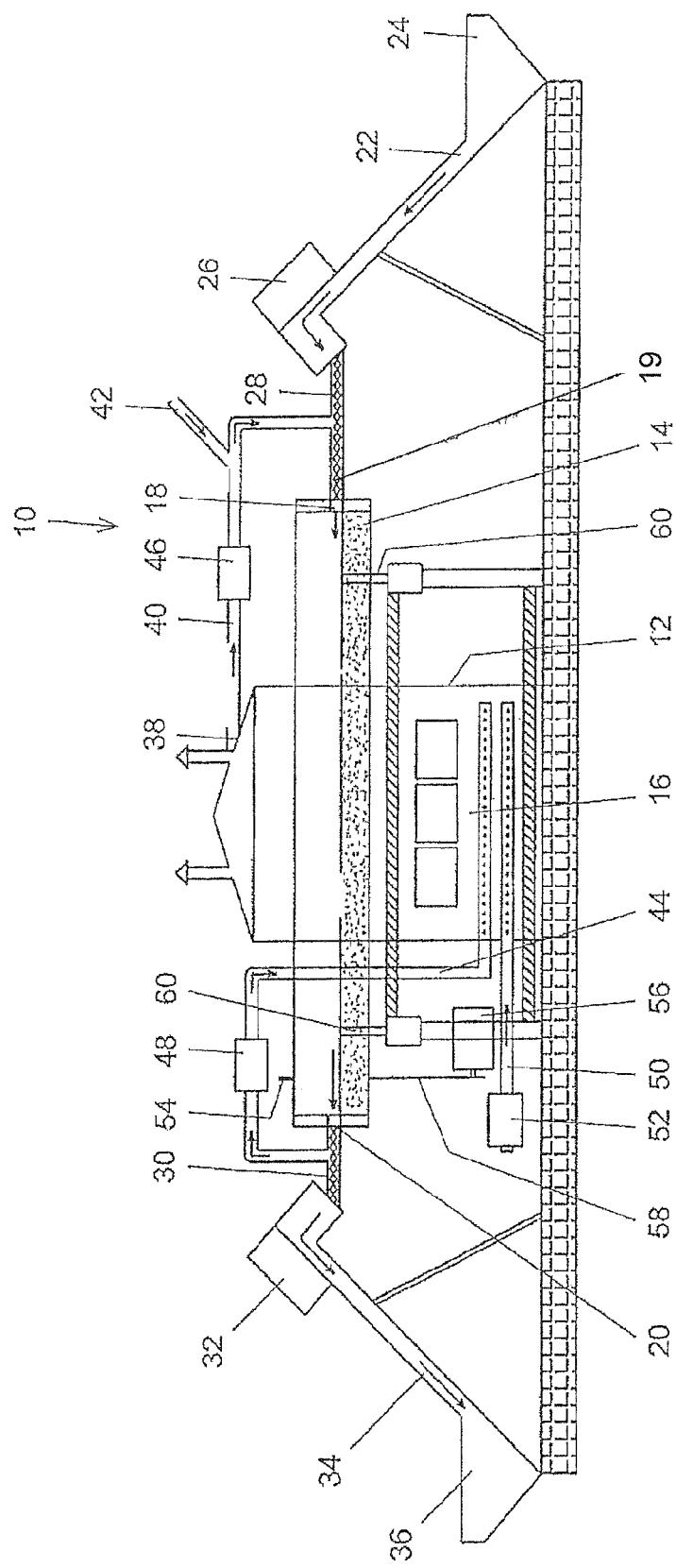
FIG. 1 is a pictorial view of torrefaction apparatus in accordance with a first embodiment of the invention.

Referring to FIG. 1 of the drawings, reference numeral 10 generally designates a torrefaction apparatus in accordance with a first embodiment of the invention. The torrefaction apparatus 10 includes walling defining an oven 12, a horizontal drum 14 extending through the oven 12, and a heat generating furnace 16 within the oven 12 and below the drum 14. The drum 14 has a biomass inlet opening 18 and a torrefied biomass outlet opening 20 which are on the axis of the drum 14. A biomass feeder 22 which comprises an inclined barrel with a rotatable feed screw in it slopes upwardly from a hopper 24 and discharges into a chamber 26. A further feeder 28 in the form of a horizontal barrel with a rotatable feed screw 19 in it leads from the chamber 26 to the inlet opening 18.

Material torrefied in the drum 14 emerges from the drum through the outlet 20 into a feeder 30 comprising a horizontal barrel with a feed screw in it. The horizontal barrel connects to a chamber 32 from which a downwardly sloping barrel 34 with a feed screw in it leads to a hopper 36.

The feed screws of the feeders 28 and 30, and the material in the turns of the feed screws, form gas seals.

The oven 12 has a gas outlet opening 38 that is connected to the feeder 28 by a pipe 40. An inert gas inlet pipe 42 is connected to the pipe 40. The inert gas entering by way of the pipe 42 can be the exhaust gas of a diesel engine, which powers the feed screws.

A second pipe 44 connects the feeder 30 to the furnace 16. The pipes 40 and 44 have blowers 46 and 48 respectively mounted in them. The furnace 16 is connected with the outside environment by a pipe 50 also having a blower 52 in it. The blower 52 provides combustion air to the furnace 16.

The drum 14 is encircled by a sprocket 54 that is connected to a motor 56 by a chain 58 for rotating the drum 14. The drum is supported by bearings 60 which permit it to rotate. The drum includes biomass lifting elements protruding inwardly from the cylindrical wall of the drum (not shown).

A steam trap (not shown) is provided for enabling water condensing out of the cooling gases in the pipe 44 to be removed from the pipe 44.

In use, biomass, which is chipped or otherwise comminuted but not dried, is fed into the drum 14 by the feeders 22 and 28. The pressure of the biomass being fed into the system together with the rotation of the drum 14 causes the biomass to be moved along the drum 14 so that it passes through the oven 12. The biomass lifting elements lift and simultaneously displace the biomass forward along the drum.

The biomass is subjected to heat which increases to a peak value in the part of the drum which is in the oven and then decreases towards the outlet 20. Furnace gases are conveyed by the pipe 40, together with additional inert gases from the diesel engine that enter through the inlet pipe 42, to the feeder 28. The gases entering the feeder 28 flow preferentially towards the drum 14 to create the torrefaction atmosphere required in the drum.

The above described circulation of gases creates a torrefaction environment in the drum 14 so that oxygen conditions do not have to be controlled.

The gases flowing in the pipe 44 include a combustible component that is burned, along with a gaseous fuel or a solid fuel, in the furnace 16.

Figure 2:
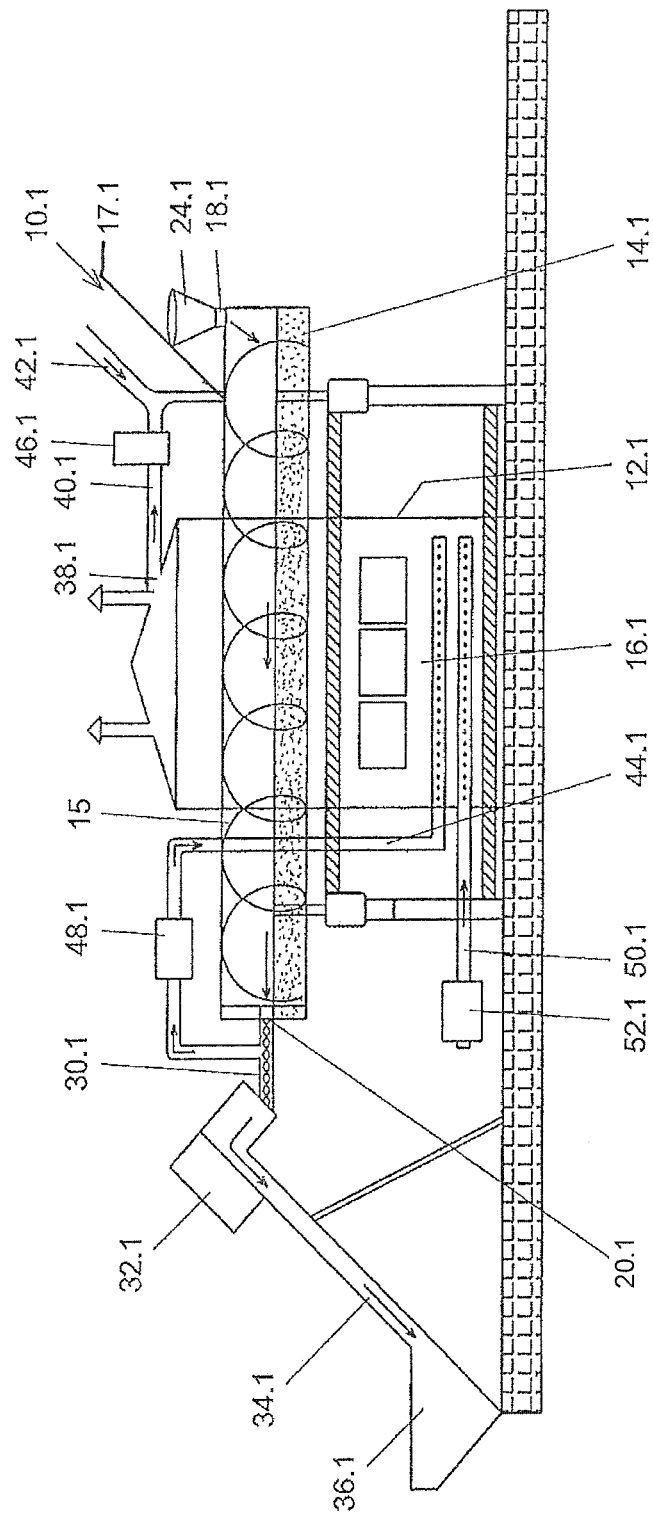
FIG. 2 is a pictorial view of torrefaction apparatus in accordance with a second embodiment of the invention.

Referring now to FIG. 2 of the drawings, reference numeral 10.1 generally shows a torrefaction apparatus in accordance with a second embodiment of the invention. The torrefaction apparatus 10.1 has components in common with the torrefaction apparatus of FIG. 1. Like parts have been designated with like numerals to which the suffix ".1" has been added.

The torrefaction apparatus 10.1 includes walling defining an oven 12.1, a non-rotatable horizontal drum 14.1 with a rotatable feed auger 15 in it extending through the oven 12.1, and a heat generating furnace 16.1 within the oven 12.1 and below the drum 14.1. The drum 14.1 has a biomass inlet 18.1 and a torrefied biomass outlet 20.1. A hopper 24.1 is connected to the inlet 18.1 and biomass falls through the inlet 18.1 into the drum 14.1. Alternatively, the hopper 24.1 may be connected to the drum by a feeder in the form of a horizontal barrel (not shown), with a rotatable feed screw in it.

Material torrefied in the drum 14.1 emerges from the drum 14.1 through the outlet 20.1 into a feeder 30.1 comprising a horizontal barrel with a feed screw in it. The horizontal barrel connects to a chamber 32.1 from which a downwardly sloping barrel 34.1 with a feed screw in it leads to a hopper 36.1.

The ends of the feed auger 15 are in the form of shafts carried in bearings mounted in disc-like end plates of the drum. One of the shafts protrudes beyond the end plate and is driven by gearing or a chain drive from a motor, thereby to rotate the auger.

The feed screws of the feeders 28.1 and 30.1, and the material in the turns of the feed screws, form gas seals.

The auger 15 pushes the biomass along the drum 14.1. It is necessary to avoid some of the biomass remaining permanently in contact with the lower part of the internal surface of the drum 14.1 as it moves along the drum 14.1 whilst a further part of the mass remains near the centre of the drum 14.1 and is insulated by the bulk of the biomass from the heated drum wall. This can be achieved by providing lifting elements which span between adjacent turns of the auger. Each lifting element, and the parts of the auger adjacent to it, forms a pocket. The biomass in the pocket is lifted towards the top dead centre position of the drum and then dropped back. This ensures that the biomass is mixed thereby promoting torrefaction of the entire mass.

The oven 12.1 has a gas outlet opening 38.1 that is connected to an opening 17.1 in the drum 14.1 by a pipe 40.1. An inert gas inlet pipe 42.1 is connected to the pipe 40.1. The inert gas can be the exhaust gas of a diesel engine, which powers the feed screws and the auger 15.

A second pipe 44.1 connects the feeder 30.1 to the furnace 16.1. The pipes 40.1 and 44.1 have blowers 46.1 and 48.1 respectively mounted in them. The furnace 16.1 is connected with the outside environment by a pipe 50.1 also having a blower 52.1 in it. The blower 52.1 provides combustion air.

A steam trap (not shown) is provided for enabling water condensing out of the cooling gases in the pipe 44.1 to be removed from the pipe 44.1.

In use, biomass, which is chipped or otherwise comminuted but not dried, is fed into the drum 14.1 from the hopper 24.1. The rotation of the auger 15 in the drum 14.1 displaces the biomass along the length of the drum 14.1 so that it passes through the oven 12.1. The biomass is subjected to heat which increases to a peak value in the part of the drum which is in the oven and then decreases towards the outlet. Furnace gases are conveyed by the pipe 40.1, together with additional inert gases from the diesel engine that enter through the inlet pipe 42.1 to the drum 14.1. The gases entering the drum 14.1 create the torrefaction atmosphere required in the drum 14.1.

The series of pocket which are provided along the length of the auger 15 lift and mix the material as described above.

The above described circulation of gases creates a torrefaction environment in the drum 14.1 so that oxygen conditions do not have to be controlled.

The gases flowing in the pipe 44.1 include a combustible component that is burned, along with a gaseous fuel or a solid fuel, in the furnace 16.1.

Figure 3:
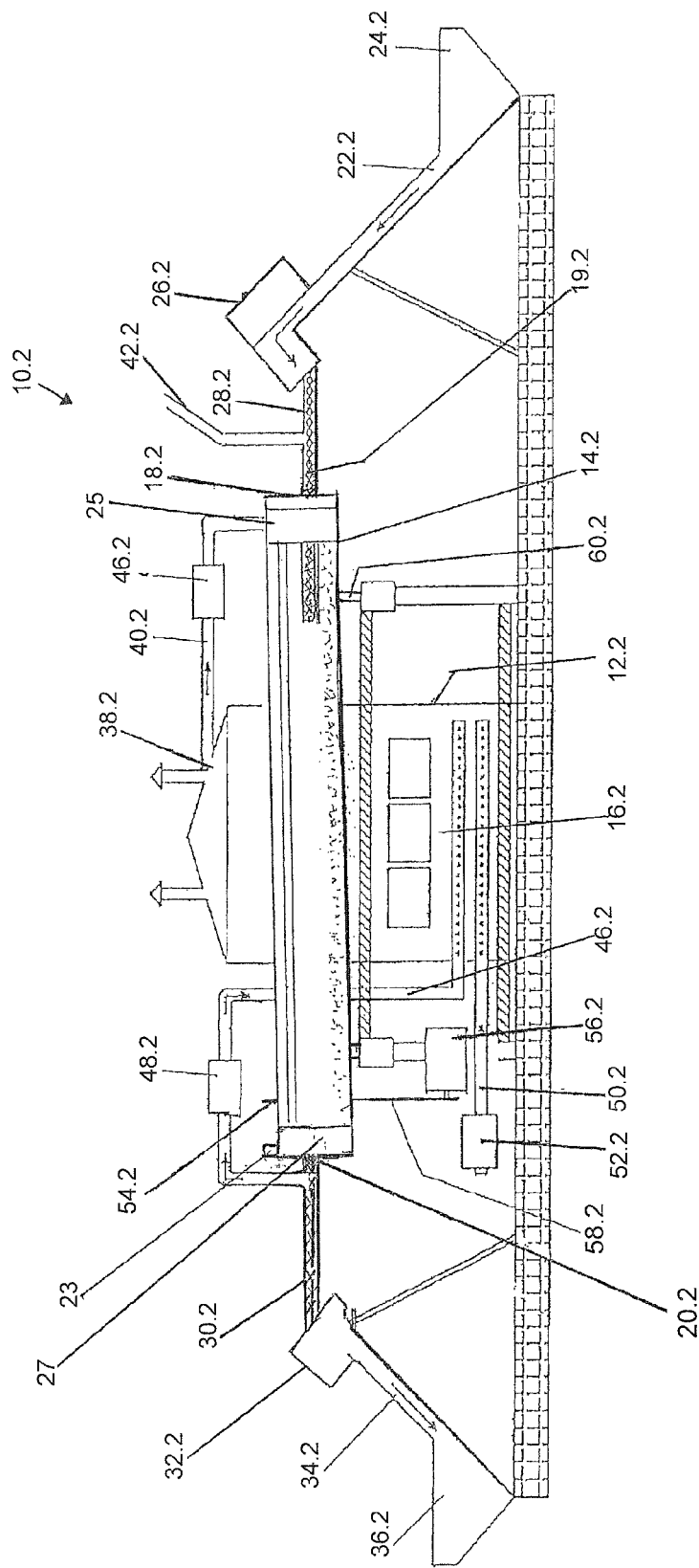
FIG. 3 is a pictorial view of torrefaction apparatus in accordance with a third embodiment of the invention.

Referring now to FIG. 3 of the drawings, reference numeral 10.2 generally shows a torrefaction apparatus in accordance with a third embodiment of the invention. The torrefaction apparatus 10.2 has components in common with the torrefaction apparatus of FIG. 1 and FIG. 2. Like parts have been designated with like numerals to which the suffix "2" has been added.

The torrefaction apparatus 10.2 includes walling defining an oven 12.2, a horizontal slightly inclined rotatable drum 14.2 extending through the oven 12.2, and a heat generating furnace 16.2 within the oven 12.2 and below the drum 14.2. The drum 14.2 has an inlet opening 18.2 and an outlet opening 20.2 which are on the axis of the drum 14.2.

A biomass feeder 22.2 which comprises an inclined barrel with a rotatable feed screw in it slopes upwardly from a hopper 24.2 and discharges into a chamber 26.2. The biomass feeder can also be a conveyor belt or a tube with a blower connected to it for lifting the biomass to the chamber 26.2.

A further feeder 28.2 in the form of a barrel with a rotatable feed screw 19.2 in it leads from the chamber 26.2 to the inlet opening 18.2.

The feed screw 19.2 has a hollow shaft and an inert gas inlet pipe 42.2 is connected to the barrel. The hollow shaft can have openings in its wall to permit gas to enter and flow into the drum. The feeder 28.2 extends through the opening 18.2 into the drum 14.2 and extends someway along it. The inert gas entering by way of the pipe 42.2 can be the exhaust gas of a diesel engine, which powers the torrefication process.

Material torrefied in the drum 14.2 emerges from the drum through the outlet 20.2 into a feeder 30.2 comprising a barrel that has a feed screw in it. The barrel connects to a chamber 32.2 from which a downwardly sloping barrel 34.2 with a discharge screw in it leads to a hopper 36.2.

The feed screws of the feeders 28.2 and 30.2, and the material in the turns of the feed screws, form gas seals.

Horizontal pipes 21 are mounted within the drum around the circumference of the drum 14.2, and are connected to a circumferentially extending array of inlet openings (not shown) in the wall of the drum near one end of the drum 14.2 and to a circumferentially extending array of outlet openings in the wall of the drum near the other end of the drum 14.2. Externally of the drum there are stationary manifolds 23 and 25 which encircle the drum and with which the openings in the drum wall communicate. The manifolds include circular seals which bear on the external cylindrical surface of the drum to prevent gas leakage from the manifolds, as the drum turns in the manifolds.

The oven 12.2 has a gas outlet opening 38.2 that is connected with a pipe 40.2 to the manifold 25. The manifold 25 has an outlet 27.

A second pipe 44.2 connects the feeder 30.2 to the furnace 16.2. The pipes 40.2 and 44.2 have blowers 46.2 and 48.2 respectively mounted in them. The furnace 16.2 is connected with the outside environment by a pipe 50.2 and may also have a blower 52.2 in it. The blower 52.2 provides combustion air to the furnace 16.2.

The drum 14.2 is encircled by a sprocket 54.2 that is connected to a motor 56.2 by a chain 58.2 for rotating the drum 14.2 or it can be gearbox drive. The drum is supported by bearings 60.2 which permit it to rotate. The drum includes biomass lifting elements (not shown) protruding inwardly from the cylindrical wall of the drum.

A steam trap (not shown) is provided for enabling water condensing out of the cooling gases in the pipe 44.2 to be removed from the pipe 44.2.

In use, biomass, which is chipped or otherwise comminuted but not dried, is fed into the drum 14.2 by the feeders 22.2 and 28.2. The feeder 28.2 forces material along the drum. This, together with the rotation and inclination of the drum 14.2, causes the biomass to be moved along the drum 14.2 so that it passes through the oven 12.2 and along the length of the heated pipes 21 inside the drum. The biomass lifting elements together with the pipes 21 lift and simultaneously displace the biomass forward along the drum 14.2.

The biomass is subjected to heat which increases to a peak value in the part of the drum which is in the oven and then decreases towards the outlet 20.2. Furnace gases are conveyed by the pipe 40.2 through an opening (not shown) to the manifold 25 and hence to the cluster of pipes 21 inside the drum, thereby transferring heat to the biomass. The furnace gases escape through the exhaust 27 after passing through the pipes 21. The inert gases that are conveyed from the diesel engine flow through the inlet pipe 42.2 into the hollow shaft of the feed screw 19.2 to the inside of the drum 14.2. The gases in the drum 14.2 create the atmosphere required in the drum for the torrefication process.

The above described circulation of gases creates a torrefaction environment in the drum 14.2 so that oxygen conditions do not have to be controlled.

The gases flowing in the pipe 44.2 include a combustible component that is burned, along with a gaseous fuel or a solid fuel, in the furnace 16.2.

The invention claimed is:

1. A torrefaction apparatus which includes:
   an elongate drum rotatable about its longitudinal axis and having a biomass inlet and a torrefied material outlet;
   a furnace external of the drum for heating the drum so that torrefaction temperature is achieved in the drum; and
   a gas inlet conduit leading to the drum from a source of inert gas, thereby to create an atmosphere in the drum which promotes torrefaction,
   wherein one or more pipes are mounted within the drum and extend along the drum, each pipe having an inlet end and an outlet end wherein a source of hot gases is operatively connected to the inlet end of each pipe.

2. The torrefaction apparatus according to claim 1, wherein the longitudinal axis of the drum is inclined.

3. The torrefaction apparatus according to claim 1, wherein the inlet ends of said pipes are connected to the furnace and the furnace is the source of hot gases.

4. The torrefaction apparatus according to claim 1, further comprising biomass lifting elements protruding inwardly from a cylindrical wall of the drum.

5. The torrefaction apparatus according to claim 1, further comprising a combustible gas outlet from the drum and a pipe leading from said outlet to said furnace for feeding to said furnace combustible gases produced by torrefaction of biomass.

6. The torrefaction apparatus according to claim 5, further comprising a steam trap in said pipe for removing water from gases flowing in said pipe.

7. The torrefaction apparatus according to claim 1, wherein said gas inlet conduit feeds furnace gases to said drum.

\* \* \* \* \*